(12) United States Patent
Holopainen et al.

(10) Patent No.: US 12,352,666 B2
(45) Date of Patent: Jul. 8, 2025

(54) METHOD, AN ARRANGEMENT AND A FREQUENCY CONVERTER FOR IDENTIFICATION OF TORSIONAL NATURAL FREQUENCIES OF A DRIVETRAIN SYSTEM

(71) Applicant: ABB Schweiz AG, Baden (CH)

(72) Inventors: Timo Holopainen, Helsinki (FI); Olli Liukkonen, Helsinki (FI); Markku Niemelä, Lappeenranta (FI)

(73) Assignee: ABB Schweiz AG, Baden (CH)

( * ) Notice: Subject to any disclaimer, the term of this patent is extended or adjusted under 35 U.S.C. 154(b) by 285 days.

(21) Appl. No.: 17/812,821

(22) Filed: Jul. 15, 2022

(65) Prior Publication Data

US 2023/0016864 A1    Jan. 19, 2023

(30) Foreign Application Priority Data

Jul. 15, 2021  (EP) .................................... 21185873

(51) Int. Cl.
*G01M 99/00*    (2011.01)
*G01H 1/00*    (2006.01)
(Continued)

(52) U.S. Cl.
CPC .......... *G01M 99/005* (2013.01); *G01H 1/003* (2013.01); *G01H 1/10* (2013.01);
(Continued)

(58) Field of Classification Search
CPC .......... G01H 1/003; G01H 1/10; G01H 13/00; G01H 17/00; G01M 99/005; H02P 21/20
See application file for complete search history.

(56) References Cited

U.S. PATENT DOCUMENTS 6,128,959 A * 10/2000 McGovern ............ G01M 13/02
73/660
2013/0162186 A1    6/2013 Schramm et al.

FOREIGN PATENT DOCUMENTS

CN        102906992 A    1/2013
EP         3849074 A1    7/2021

OTHER PUBLICATIONS

Mauri, Marco, et al.; "Generation of torsional excitation in a variable-speed-drive system"; 2016 International Symposium on Power Electronics, Electrical Drives, Automation and Motion (Speedam); IEEE, Capri, Italy; Jun. 22, 2016; 6 Pages.
(Continued)

*Primary Examiner* — Benjamin R Schmitt
(74) *Attorney, Agent, or Firm* — Whitmyer IP Group LLC

(57) ABSTRACT

A field of electric drive devices, drivetrain systems and electric machines, such as electric motors and electric generators for industrial applications, and more particularly to a method, an arrangement, and a frequency converter for identification of torsional natural frequencies of a drivetrain system. In the arrangement for identification of torsional natural frequencies of a drivetrain system according to the present invention, the drivetrain system includes a frequency converter, an electric machine controlled by the frequency converter, and a driven/driving machine system connected to the electric machine, wherein the frequency converter is arranged for controlling the electric machine for producing mechanical excitation by the electric machine in the drivetrain system, the excitation effecting an excitation response in the drivetrain system; and wherein the frequency converter or a data analysis system of the arrangement is arranged for identifying torsional natural frequencies of the drivetrain system utilizing the excitation response.

10 Claims, 6 Drawing Sheets

(51) Int. Cl.
  *G01H 1/10*    (2006.01)
  *G01H 13/00*   (2006.01)
  *G01H 17/00*   (2006.01)
  *H02P 21/20*   (2016.01)

(52) U.S. Cl.
  CPC ............ *G01H 13/00* (2013.01); *G01H 17/00* (2013.01); *H02P 21/20* (2016.02)

(56) References Cited

OTHER PUBLICATIONS

Zhang, Qingjie, et al.; "Torsional Vibration Analysis of Shaft in an Induced Draft Fan Due to Variable Frequency Drive"; IEEE Access, vol. 8, IEEE; Sep. 24, 2020; 13 Pages.

European Search Report; Application No. EP 21 18 5873; Completed: Dec. 1, 2021; 3 Pages.

Bruha, Martin, et al.; "Torsional Issues Related to Variable Frequency Control of Elastic Drive Systems"; IECON 2016—42nd Annual Conference of the IEEE Industrial Electronics Society; Florence, Italy; Oct. 23, 2016; 7 Pages.

Venkataraman, Balaji, et al.; "Torsional Vibrations in Electric Motor Driven Compressor Trains"; 2019 IEEE Petroleum and Chemical Industry Committee Conference (PCIC), Vancouver, BC, Canada; Sep. 9, 2019; 8 Pages.

European Office Action; Application No. 21185873.3; Issued: Nov. 13, 2024; 5 Pages.

\* cited by examiner

METHOD, AN ARRANGEMENT AND A FREQUENCY CONVERTER FOR IDENTIFICATION OF TORSIONAL NATURAL FREQUENCIES OF A DRIVETRAIN SYSTEM

TECHNICAL FIELD

The present invention relates to the field of electric drive devices, drivetrain systems and electric machines, such as electric motors and electric generators for industrial applications, and more particularly to a method, an arrangement, and a frequency converter for identification of torsional natural frequencies of a drivetrain system.

BACKGROUND

Electric drive arrangements and drivetrain systems are widely used for industrial applications, e.g. for providing and controlling electrical power and energy to various public and industrial applications as well as for driving and controlling various public and industrial applications. Electric drives are used in industry for different applications, such as for driving motors within the transportation industry, for driving different devices within the process and manufacturing industry as well as within the energy industry. There are applications commonly used for electric drives within the transportation industry for example in metro and railway traffic applications as well as in ship propulsion unit applications of the marine industry. Within the process and manufacturing industry, electric drives can be used for example in conveyer applications, in mixer applications or even in paper machine applications. Within the energy industry, electric drives can be used for example as electric drives for wind turbines of the wind power industry.

Electric drives for electric machines, such as for electric motors and electric generators, may be divided into DC drives (DC, direct current) and AC drives (AC, alternating current). E.g., in a DC motor of a DC drive, a magnetic field is generated by the current through the field winding in the stator. This magnetic field is always maintained at right angles to the field generated by the armature winding. In this way, a DC motor's torque is generated, which torque can then be easily controlled in a DC drive by changing the armature current and keeping the magnetizing current constant. In a DC drive, also the DC motor speed can be controlled directly through armature current.

Within electric drives, the AC drives may further be divided into frequency-controlled AC drives, flux-vector-controlled AC drives and into AC drives utilising direct torque control (DTC, Direct Torque Control). In flux-vector-controlled AC drives and in direct torque control AC drives the torque of the three-phase motor or generator can be controlled, whereas in frequency-controlled AC drives the driven/driving machine dictates the torque level.

In electric machine installations, an electric machine is often installed as a part of a torsional drivetrain system, i.e. drivetrain system. In a typical drivetrain system, there is an electric machine which is connected to a driven machine or to a driving machine. Typical features of this torsional drivetrain are the natural frequencies of the system. Electric machines and driven machines have most of their excitation frequencies proportional to the rotational or supply frequency. An important design principle is the avoidance of resonances induced by the coincidence of the mentioned excitation frequencies and natural frequencies.

Usually, the lowest excitation frequency is the rotational frequency, and the first torsional natural frequency is adjusted above or below the rotational frequency of the system. This adjustment is based on a torsional analysis of the system. Customarily, the torsional vibrations are not measured during the commissioning of the drivetrains due to the missing practical equipment for this purpose. Usually, this measurement requires specific parts mounted on rotor system and special purpose transducers. Identifying potential risks is beneficial in predictive condition monitoring and diagnostics.

There are several problems with prior art solutions for identification of torsional natural frequencies of a drivetrain system. Today, the torsional vibration design relies purely on the calculation results. Unfortunately, the torsional vibrations cannot be observed easily using traditional vibration transducers. Thus, a broken rotor due to a torsional resonance may appear suddenly without any warning. This means that a minor calculation or design mistake may lead to catastrophic consequences, because the separation margins against the torsional natural frequencies cannot be experimentally validated.

In today's demanding environment, there is a need for a more efficient and easier solution for a method and an arrangement for identification of torsional natural frequencies of a drivetrain system and a need for a solution for a drivetrain system, the condition of which can be more efficiently maintained. There is a demand in the market for a method and an arrangement for identification of torsional natural frequencies of a drivetrain system that would be more efficient and easier to carry out in operational condition than the current prior art solutions.

SUMMARY

The object of the invention is to introduce a method, an arrangement, and a frequency converter for identification of torsional natural frequencies of a drivetrain system, the condition of which can be more efficiently maintained. Advantageous embodiments are furthermore presented.

It is brought forward a new method for identification of torsional natural frequencies of a drivetrain system, said drivetrain system comprising a frequency converter, an electric machine controlled by said frequency converter, and a driven/driving machine system connected to said electric machine, in which method mechanical excitation is produced in said drivetrain system by said frequency converter controlled electric machine, said excitation effecting an excitation response in said drivetrain system; and torsional natural frequencies of said drivetrain system are identified utilizing said excitation response.

In a preferred embodiment, in said method, said excitation comprises torsional excitation as an impulse, random noise, pseudo random noise, a harmonic excitation or a harmonic excitation sweep.

In a preferred embodiment, in said method, said excitation response is measured by said frequency converter from the current flowing between said frequency converter and said electric machine as measured current data.

In a preferred embodiment, the condition of the drivetrain system is analysed and determined utilizing said identified torsional natural frequencies of said drivetrain system.

Furthermore, it is brought forward a new arrangement for identification of torsional natural frequencies of a drivetrain system, said drivetrain system comprising a frequency converter, an electric machine controlled by said frequency converter, and a driven/driving machine system connected to said electric machine, wherein said frequency converter is arranged for controlling said electric machine for producing mechanical excitation by said electric machine in said drivetrain system, said excitation effecting an excitation response in said drivetrain system; and wherein said frequency converter or a data analysis system of said arrangement is arranged for identifying torsional natural frequencies of said drivetrain system utilizing said excitation response.

In a preferred embodiment, in said arrangement, said excitation comprises torsional excitation as an impulse, random noise, pseudo random noise, a harmonic excitation or a harmonic excitation sweep.

In a preferred embodiment, said frequency converter is arranged for measuring said excitation response from the current flowing between said frequency converter and said electric machine as measured current data.

In a preferred embodiment, in said arrangement, said frequency converter of said arrangement is arranged for analysing and determining the condition of the drivetrain system utilizing said identified torsional natural frequencies of said drivetrain system.

In a preferred embodiment, said frequency converter comprises a data gathering unit arranged for gathering data, said gathered data comprising control data for said electric machine and said measured current data; and a data analysis unit arranged for analysing said gathered data and for identifying torsional natural frequencies of said drivetrain system and/or for determining the condition of said drivetrain system.

In a preferred embodiment, said arrangement comprises a data analysis system, and wherein said frequency converter comprises a data gathering unit arranged for gathering data, said gathered data comprising control data for said electric machine and said measured current data; and a connection unit arranged for transmitting said gathered data to said data analysis system, wherein said data analysis system is arranged for analysing said gathered data and for identifying torsional natural frequencies of said drivetrain system and/or for determining the condition of said drivetrain system.

In a preferred embodiment, said arrangement comprises a user apparatus, and wherein said connection unit arranged for transmitting said gathered data to said data analysis system via said user apparatus, and wherein said user apparatus is arranged for receiving said gathered data from said connection unit and for forwarding said gathered data to said data analysis system.

Furthermore, it is brought forward frequency converter fora drivetrain system, said drivetrain system comprising said frequency converter, an electric machine controlled by said frequency converter, and a driven/driving machine system connected to said electric machine, wherein said frequency converter is arranged for controlling said electric machine for producing mechanical excitation by said electric machine in said drivetrain system, said excitation effecting an excitation response in said drivetrain system; and for identifying torsional natural frequencies of said drivetrain system utilizing said excitation response.

In a preferred embodiment of said frequency converter, said excitation comprises torsional excitation as an impulse, random noise, pseudo random noise, a harmonic excitation, or a harmonic excitation sweep.

In a preferred embodiment, said frequency converter is arranged for measuring said excitation response from the current flowing between said frequency converter and said electric machine as measured current data.

In a preferred embodiment, said frequency converter is arranged for analysing and determining the condition of the drivetrain system utilizing said identified torsional natural frequencies of said drivetrain system.

BRIEF DESCRIPTION OF THE DRAWINGS

In the following, the present invention will be described in more detail by way of example and with reference to the attached drawings, in which.

The foregoing aspects, features and advantages of the invention will be apparent from the drawings and the detailed description related thereto.

In the following, the invention will be described in greater detail by means of preferred embodiments with reference to the accompanying drawings of FIGS. 1 to 6.

DETAILED DESCRIPTION

The arrangement for identification of torsional natural frequencies of a drivetrain system according to one embodiment of the present invention, in which said drivetrain system comprises a frequency converter, an electric machine controlled by said frequency converter, and a driven/driving machine system connected to said electric machine, in which arrangement said frequency converter is arranged for controlling said electric machine for producing mechanical excitation by said electric machine in said drivetrain system, said excitation effecting an excitation response in said drivetrain system; and wherein said frequency converter or a data analysis system of said arrangement is arranged for identifying torsional natural frequencies of said drivetrain system utilizing said excitation response.

Figure 1:
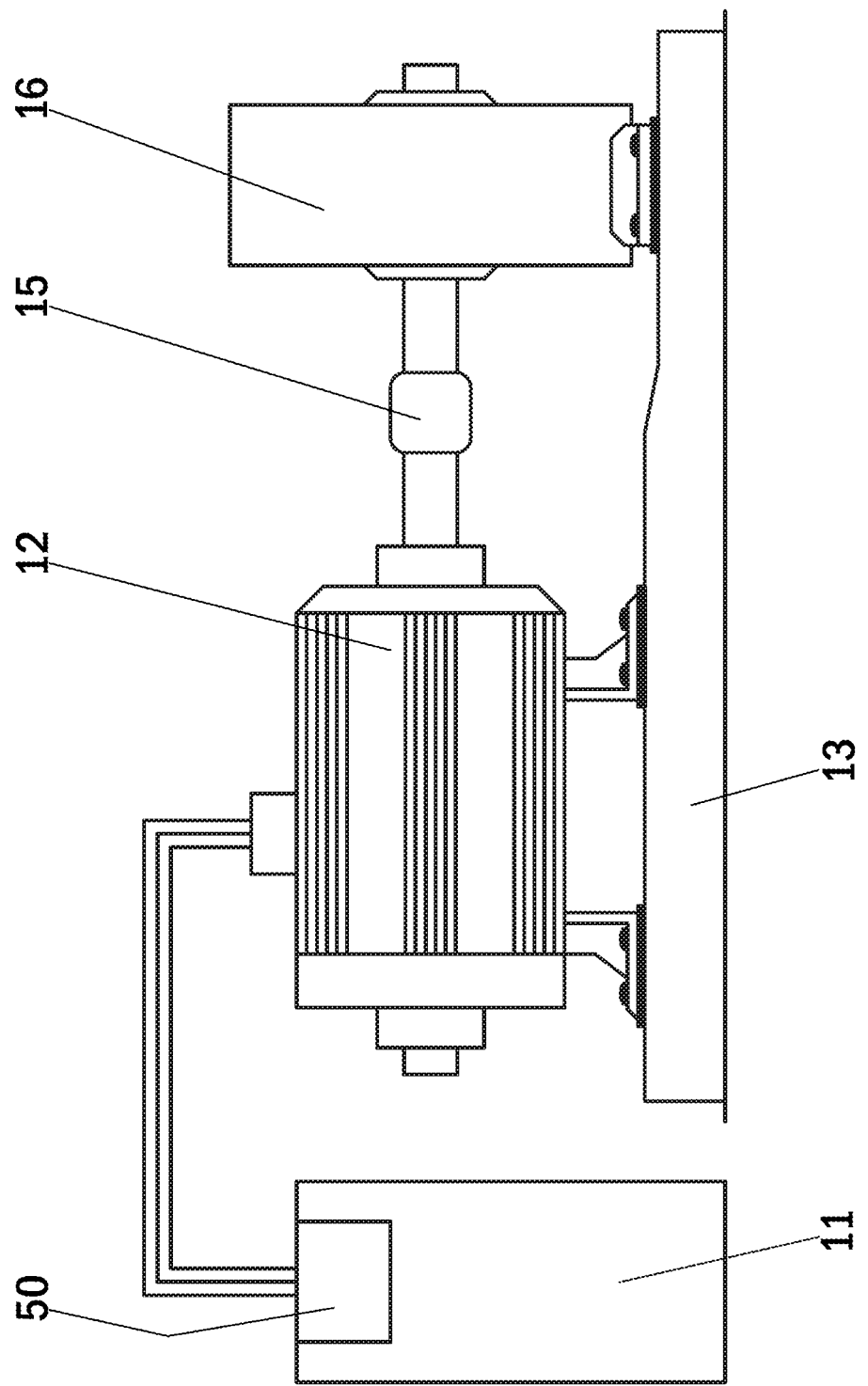
FIG. 1 illustrates a diagram of an embodiment of an arrangement for identification of torsional natural frequencies of a drivetrain system according to the present invention.

FIG. 1 illustrates a diagram of an embodiment of an arrangement for identification of torsional natural frequencies of a drivetrain system according to the present invention. In the presented embodiment of an arrangement for identification of torsional natural frequencies of a drivetrain system, said drivetrain system comprises a frequency converter 11, an electric machine 12 controlled by said frequency converter 11, and a driven/driving machine system 16 connected to said electric machine 12. In the presented embodiment said electric machine is a motor 12, which motor is installed on a motor foundation 13. In the presented embodiment, said driven/driving machine system 16 is a driven machine 16 connected to said motor 12 via a coupling arrangement 15. Whereas in the presented embodiment a driven machine 16 connected to said motor 12 is shown as a driven/driving machine system 16, in another embodiment of the present invention the driven/driving machine system 16 could be replaced by one or more driven/driving machine devices and/or one or more gears/gear arrangements and/or one or more shafts/shaft systems connected to said motor 12. Whereas in the presented embodiment a motor is shown as an electric machine, in another embodiment of the present invention the motor could be replaced by a generator as an electric machine.

In the presented embodiment of an arrangement for identification of torsional natural frequencies of a drivetrain system according to the present invention, the frequency converter 11 comprises a control device 50 arranged to measure current provided by the frequency converter 11 to the motor 12 as measured current data. In the presented embodiment, the frequency converter 11 is used for controlling said motor 12 for producing mechanical excitation by said motor 12 in said drivetrain system, i.e. excitation torque. The control device 50 of the frequency converter 11 may also be used for controlling said motor 12 for producing mechanical excitation by said motor 12 in said drivetrain system. Said excitation produced by said motor 12 generates an excitation response detectable from the current flowing between said frequency converter 11 and said electric machine 12. The excitation response is thereafter measured from said current flowing between said frequency converter 11 and said electric machine 12 by said control device 50 of the frequency converter 11 as measured current data. With the help of the measured current data, the torsional natural frequencies of a drivetrain system can be identified.

In the presented embodiment, the frequency converter 11 controls said motor 12 for producing excitation by said motor 12 in said drivetrain system, i.e. excitation torque and enables the identification of torsional natural frequencies of the drivetrain system driven by said frequency converter 11. In the presented embodiment, the frequency converter 11 may also identify said torsional natural frequencies of the drivetrain system.

Figure 2:
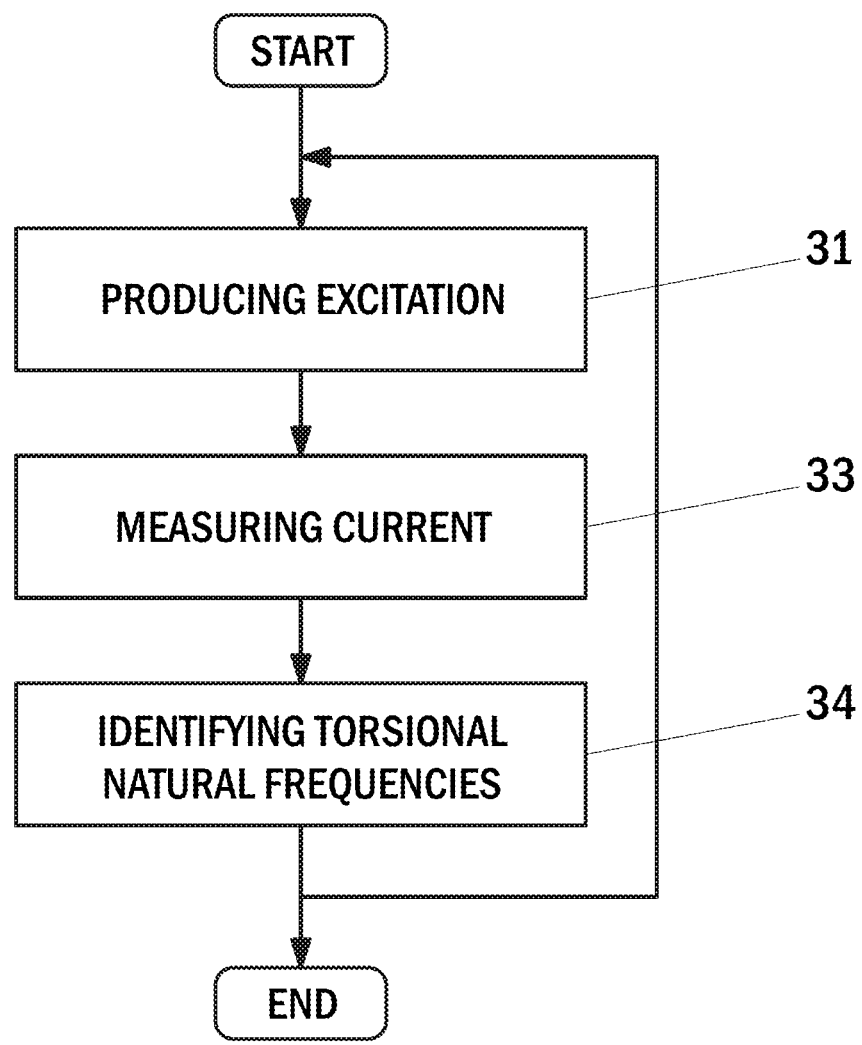
FIG. 2 illustrates a flow diagram of an embodiment of a method for identification of torsional natural frequencies of a drivetrain system according to the present invention.

FIG. 2 illustrates a flow diagram of an embodiment of a method for identification of torsional natural frequencies of a drivetrain system according to the present invention. Said drivetrain system comprises a frequency converter 11, an electric machine 12 controlled by said frequency converter 11, and a driven/driving machine system 16 connected to said electric machine 12. In the method according to the present embodiment, mechanical excitation, i.e. excitation torque is first produced 31 in said drivetrain system with the help of said frequency converter 11 controlled electric machine 12. In the presented embodiment, the excitation produced 31 by the frequency converter 11 controlled electric machine 12 may comprise torsional excitation as an impulse, random noise, pseudo random noise, a harmonic excitation, or a harmonic excitation sweep. The frequency converter 11 can control said electric machine 12 for producing the mechanical excitation during any operational condition. In an embodiment, the frequency of harmonic excitation is varied slowly but continuously through the frequency range of interest.

Thereafter, the current flowing between the frequency converter 11 and the electric machine is measured 33 as excitation response. The excitation produced by the frequency converter 11 controlled electric machine 12 effects an excitation response in said drivetrain system detectable by said frequency converter 11 from the current flowing between said frequency converter 11 and said electric machine 12. When the detected current of excitation response from the electric machine is measured 33, as a result measured current data is produced.

Thereafter, with the help of the measured current data and the generated frequency response function, torsional natural frequencies of the electric machine are then identified 34. In the method according to the present embodiment, the steps of producing excitation 31, measuring current 33 and identifying torsional natural frequencies 34 are repeated several times in a continuous loop, as deemed necessary.

In the presented embodiment, the frequency converter 11 controls said electric machine 12 for producing 31 the mechanical excitation, i.e. excitation torque and enables the identification of torsional natural frequencies of the drivetrain system driven by said frequency converter 11. In the presented embodiment, the frequency converter 11 may also identify said torsional natural frequencies of the drivetrain system.

In the presented embodiment, said frequency converter 11 may also identify the current harmonics of the drivetrain system. Also, in said frequency converter 11, a harmonic excitation sweep can be programmed to the operating system of said frequency converter 11 to be executed by the control device 50 of said frequency converter 11.

In the presented embodiment, said frequency converter 11 is arranged to produce estimate about the motor speed and torque, based on the phase current measurements, dc-voltage measurements and pre-defined motor model. Thus, in an embodiment, this approach is used to identify the main torsional natural frequencies of the system. Further, in an embodiment, in said frequency converter 11, these natural frequencies are compared to the main excitation frequencies and the fulfillment of the separation margin requirements can be assessed. In an embodiment, this evaluation is carried out in different operation conditions and the trend values of natural frequencies can be used for condition monitoring purposes.

The torsional vibration induces harmonic stator currents at the two frequencies: $f=f_s \pm f_v$, where $f_s$ is the supply frequency $f_v$ and the torsional vibration frequency. In the presented embodiment, the natural frequencies of the drivetrain are identified by exciting the rotor system by a harmonic sweep with constant torque amplitude. The vibration response of these stator harmonic currents reach local maxima with resonance frequencies.

In an embodiment, we denote the excitation frequency by $f_e$. We assume here that the fundamental motor supply frequency is constant. In an embodiment, the harmonic torque sweep produces torsional vibrations and harmonic currents: $f_1=f_s-f_e$ and $f_2=f_s+f_e$. In an embodiment, the local maximum $f_{1m}$ gives a resonance $f_{e1}=f_s-f_{1m}$, and the local maximum $f_{2m}$ gives a resonance $f_{e2}=f_s-f_{2m}$. Depending on the frequency range of the harmonic sweep excitation, there are one or more local maxima and resonances. In an embodiment, these resonances are identified by the amplitude of the resonance peak. The most important resonances have the largest amplitudes.

In an embodiment, the current measurement is produced by the same measurement arrangement that is used to generate feedback signal to current controller in the main control board. In this embodiment, there are no needs for the additional current sensors or signal analyze. The measured current can be used to generate accurate estimate about the motor air gap torque and motor shaft speed. In an embodiment, these estimates are calculated in the same control device which produces control signals to gate drivers.

In an embodiment, system response to torque excitation is seen in the motor current. Therefore, in an embodiment, having the estimate of the air gap torque based on these currents, the response of the system can also be seen in this estimate. In an embodiment, the frequency of torsional nominal mode practically corresponds local amplitude maximum in spectrum generated from speed estimate signal.

Figure 3:
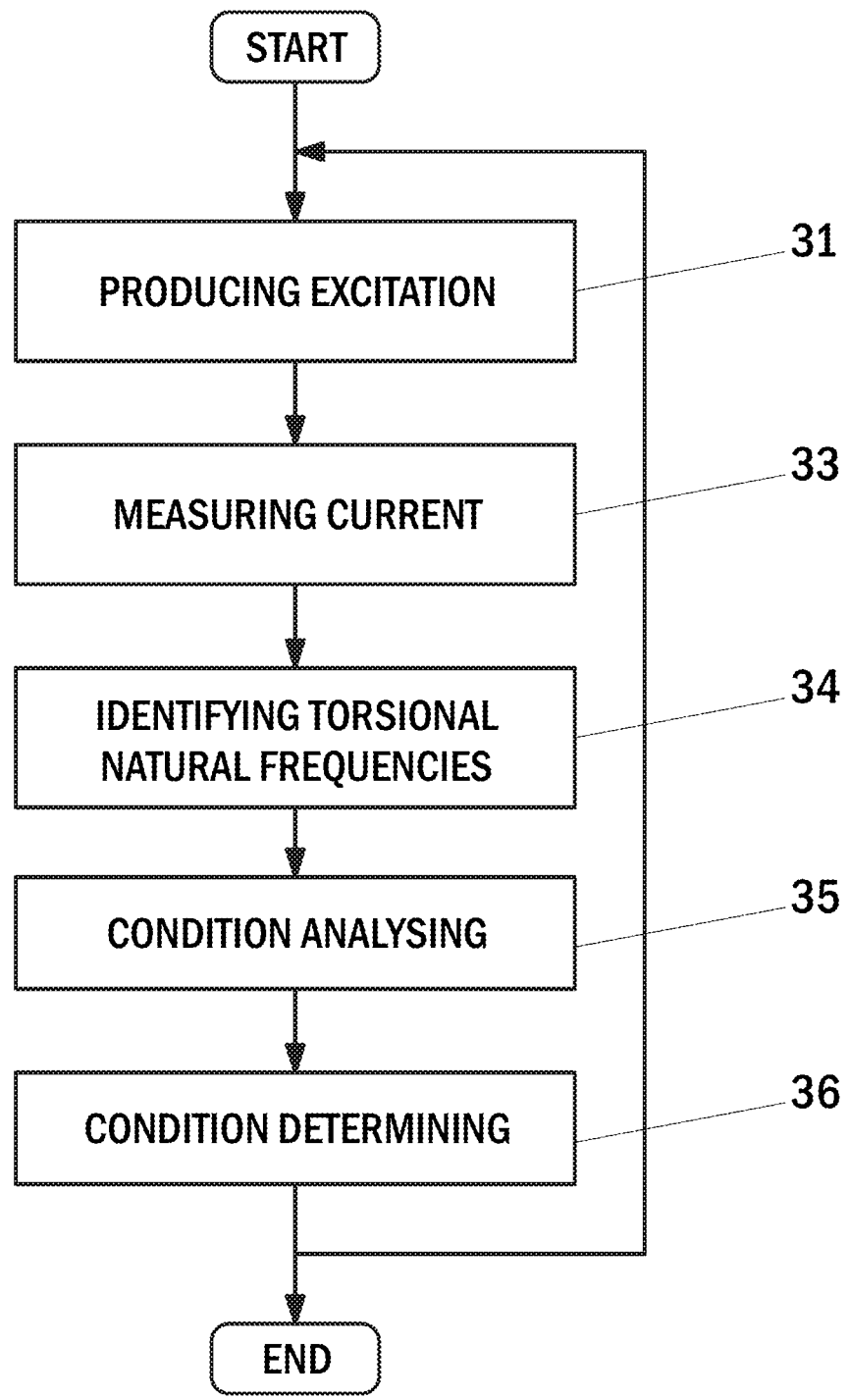
FIG. 3 illustrates a flow diagram of another embodiment of a method for identification of torsional natural frequencies of a drivetrain system according to the present invention.

FIG. 3 illustrates a flow diagram of another embodiment of a method for identification of torsional natural frequencies of a drivetrain system according to the present invention. Said drivetrain system comprises a frequency converter 11, an electric machine 12 controlled by said frequency converter 11, and a driven/driving machine system 16 connected to said electric machine 12. In the method according to the present another embodiment, mechanical excitation, i.e. excitation torque is first produced 31 in said drivetrain system with the help of said frequency converter 11 controlled electric machine 12. In the presented another embodiment, the excitation produced 31 by the frequency converter 11 controlled electric machine 12 may comprise torsional excitation as an impulse, random noise, pseudo random noise, a harmonic excitation, or a harmonic excitation sweep. The frequency converter 11 can control said electric machine 12 for producing the mechanical excitation during any operational condition. In an embodiment, the frequency of harmonic excitation is varied slowly but continuously through the frequency range of interest.

Thereafter, the current flowing between the frequency converter 11 and the electric machine is measured 33 as excitation response. The excitation produced by the frequency converter 11 controlled electric machine 12 effects an excitation response in said drivetrain system detectable by said frequency converter 11 from the current flowing between said frequency converter 11 and said electric machine 12. When the detected current of excitation response from the electric machine is measured 33, as a result measured current data is produced. Thereafter, with the help of the measured current data and the generated frequency response function, torsional natural frequencies of the electric machine are then identified 34. In the presented embodiment, the frequency converter 11 controls said electric machine 12 for producing 31 the mechanical excitation, i.e. excitation torque and enable the identification of torsional natural frequencies of the drivetrain system driven by said frequency converter 11. In the presented embodiment, the frequency converter 11 may also identify said torsional natural frequencies of the drivetrain system.

As the next step, in the presented another embodiment method for identification of torsional natural frequencies of a drivetrain system according to the present invention, the condition of the electric machine is analysed 35 utilizing said identified torsional natural frequencies of the electric machine. When the condition of the electric machine is analysed 35, as a result condition analysis of the electric machine is produced. Thereafter, with the help of the produced condition analysis of the electric machine, the condition of the electric machine is then determined 36. In the method according to the present embodiment, the steps of producing excitation 31, measuring current 33, identifying torsional natural frequencies 34, condition analysing 35 and condition determining 36 are repeated several times in a continuous loop, as deemed necessary.

Figure 4:
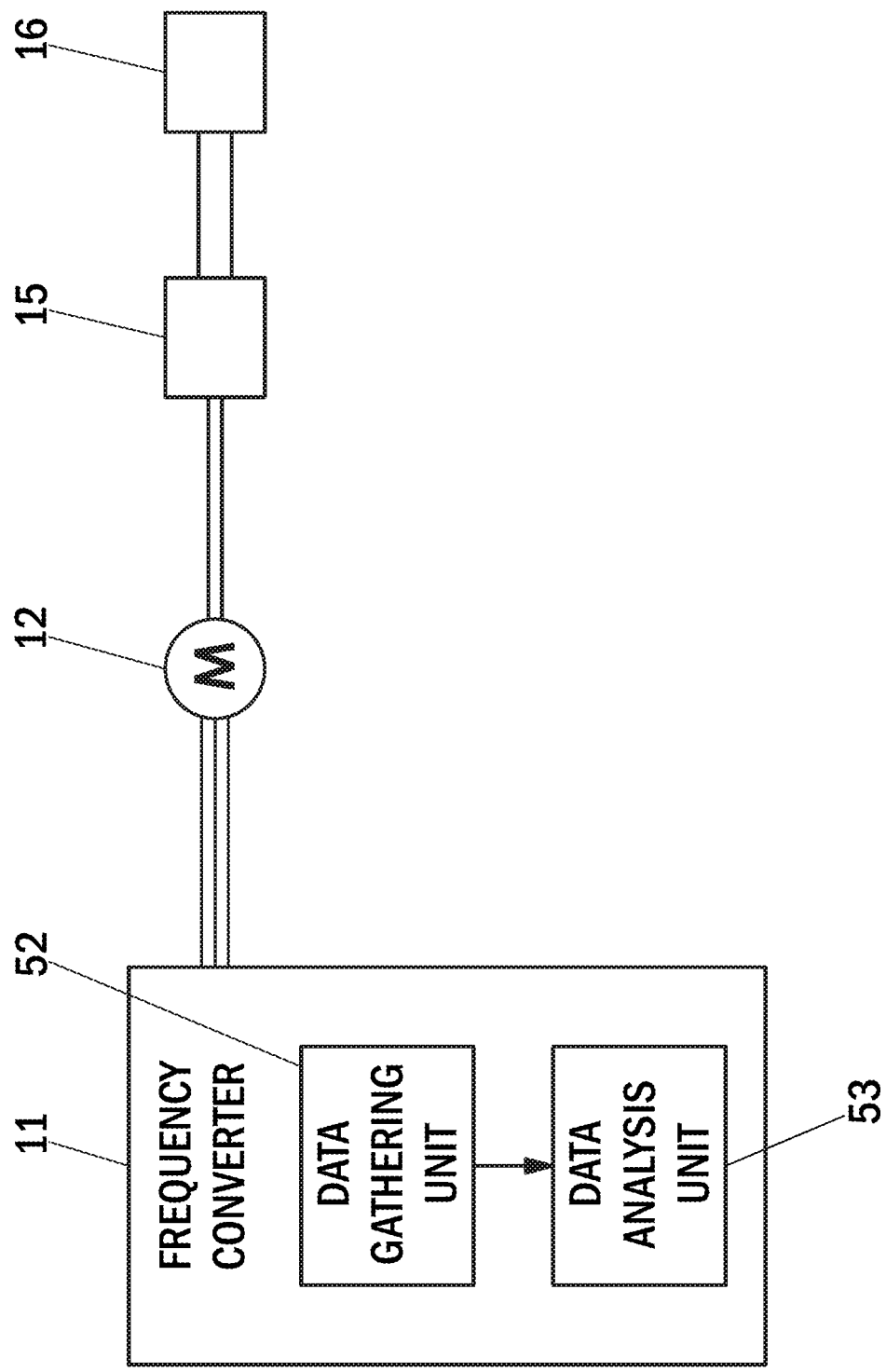
FIG. 4 illustrates a block diagram of another embodiment of an arrangement for identification of torsional natural frequencies of a drivetrain system according to the present invention.

FIG. 4 illustrates a block diagram of another embodiment of an arrangement for identification of torsional natural frequencies of a drivetrain system according to the present invention. In the presented another embodiment of an arrangement for identification of torsional natural frequencies of a drivetrain system, said drivetrain system comprises a frequency converter 11, an electric machine 12 controlled by said frequency converter 11, and a driven/driving machine system 16 connected to said electric machine 12 via a coupling arrangement 15. Whereas in the presented embodiment a motor is shown as an electric machine, in another embodiment of the present invention the motor could be replaced by a generator as an electric machine. Whereas in the presented embodiment a driven machine system is shown as a driven/driving machine system, in another embodiment of the present invention the driven machine system could be replaced by a driving machine system as driven/driving machine system.

In the presented another embodiment of an arrangement for identification of torsional natural frequencies of a drivetrain system, the frequency converter 11 is arranged to control said motor 12 for producing mechanical excitation by said motor 12 in said drivetrain system. Said the frequency converter 11 is also arranged to measure the current flowing between said frequency converter 11 and said motor 12 as measured current data and arranged to detect an excitation response from said measured current data.

In presented another embodiment of an arrangement for identification of torsional natural frequencies of a drivetrain system, the data gathering, and analysis is implemented on the frequency converter 11. In the presented another embodiment, the frequency converter 11 comprises a data gathering unit 52 and a data analysis unit 53.

Said data gathering unit 52 gathers data related to the identifying torsional natural frequencies of a drivetrain system, said gathered data comprising control data for motor 12 and excitation response data as measured current data. Said control data for motor 12 comprises excitation control data for producing excitation, i.e. excitation torque. Said gathered data comprises measured current data as excitation response data.

The data gathering unit 52 then sends the gathered data to the data analysis unit 53. The data analysis unit 53 then analyses said gathered data and identifies, according to the present disclosure, the torsional natural frequencies of the electric machine and/or the condition of the electric machine.

In an embodiment, also other direct measurements which are connected to frequency converter 11 or estimates based on those measurements, are used to detect the response of the system to this excitation produced by the frequency converter itself. In this embodiment, no external measurement devices or sensors are needed. In an embodiment, these measurements are analyzed in a control device 50 of said frequency converter 11, including at least one microprocessor, said control device 50 being connected to frequency converter gate controller or the main control board, and said control device 50 arranged to measure the current flowing between said frequency converter 11 and said motor 12 as measured current data and arranged to detect an excitation response from said measured current data. Said control device 50 can also be the same device as the control board itself. Together with gate driving machine, this said control device 50 generates control signal to power electronic components, which combined produce a supply voltage to the electrical machine.

In an embodiment, said control device 50 generates an excitation signal so that the signal waveform, amplitude, and the frequency are defined according to separate calculation process that is done in this same control device 50. This calculation process is based on the predefined rules and model of the shaft system. Shaft system model can be for example two-mass model with a single stiffness and damping value. In an embodiment, the excitation signal is based on simulation model that is done in the system design phase. This simulation model is operated by in a different system while the optimized excitation signal is transferred to control device as a fixed value. Said control device 50 analyses the response of the system with similar manner even if the torque excitation is produced by some other device or component in the system. As an example of this, control device 50, which calculates a real time estimate about the motor speed, based on the motor current measurements, detects motor speed changes caused by the driven machine deviation.

Figure 5:
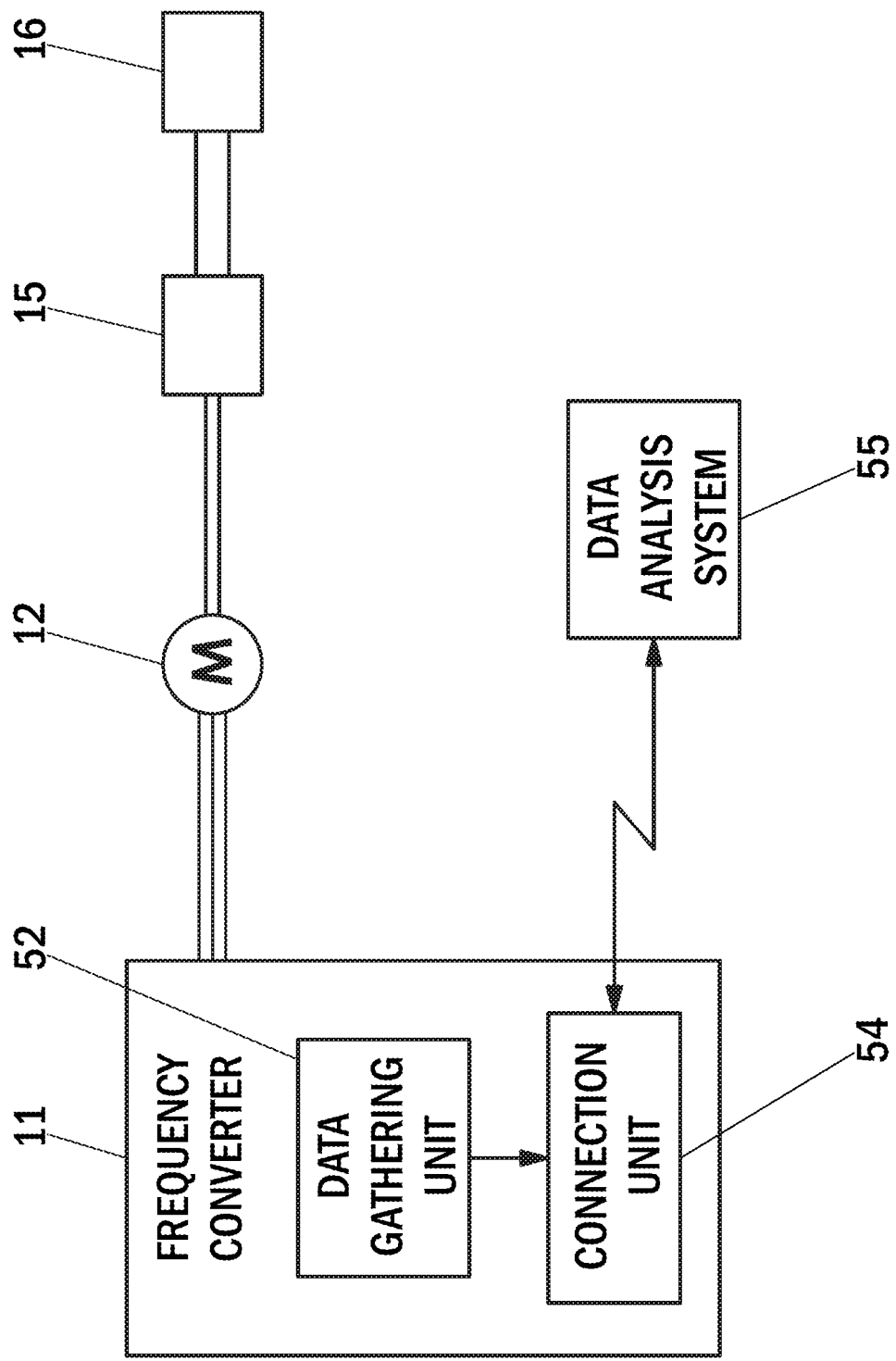
FIG. 5 illustrates a block diagram of a third embodiment of an arrangement for identification of torsional natural frequencies of a drivetrain system according to the present invention.

FIG. 5 illustrates a block diagram of a third embodiment of an arrangement for identification of torsional natural frequencies of a drivetrain system according to the present invention. In the presented third embodiment of an arrangement for identification of torsional natural frequencies of a drivetrain system, said drivetrain system comprises a frequency converter 11, an electric machine 12 controlled by said frequency converter 11, and a driven/driving machine system 16 connected to said electric machine 12 via a coupling arrangement 15. Whereas in the presented embodiment a motor is shown as an electric machine, in another embodiment of the present invention the motor could be replaced by a generator as an electric machine. Whereas in the presented embodiment a driven machine system is shown as a driven/driving machine system, in another embodiment of the present invention the driven machine system could be replaced by a driving machine system as driven/driving machine system.

In the presented third embodiment of an arrangement for identification of torsional natural frequencies of a drivetrain system, the frequency converter 11 is arranged to control said motor 12 for producing mechanical excitation by said motor 12 in said drivetrain system. Said the frequency converter 11 is also arranged to measure the current flowing between said frequency converter 11 and said motor 12 as measured current data and arranged to detect an excitation response from said measured current data.

In presented third embodiment of an arrangement for identification of torsional natural frequencies of a drivetrain system, the data analysis is implemented on an external data analysis system 55. Said external data analysis system 55 may be realized as a partially external data analysis system or as an entirely external data analysis system. In the presented third embodiment, the frequency converter 11 comprises a data gathering unit 52 and a connection unit 54.

Said data gathering unit 52 gathers data related to the identifying torsional natural frequencies of a drivetrain system, said gathered data comprising at least control data for motor 12. Said control data for motor 12 comprises excitation control data for producing excitation, i.e. excitation torque. Said gathered data comprises measured current data as excitation response data.

The data gathering unit 52 then forwards said gathered data to the connection unit 54. The connection unit 54 is arranged to receive said gathered data from the data gathering unit 52 and to transmit said gathered data to said data analysis system 55.

The data analysis system 55 is arranged to receive said gathered data from the connection unit 54 of the frequency converter 11. The data analysis system 55 may be implemented in a computer. Said computer may be a laptop, a desktop computer, or a cluster of computer servers, for example. The connection unit 54 may connect to said computer via one or more known communication networks, such as Ethernet, for example. The data analysis system 55 then analyses said gathered data and identifies, according to the present disclosure, the torsional natural frequencies of the electric machine and/or the condition of the electric machine.

Figure 6:
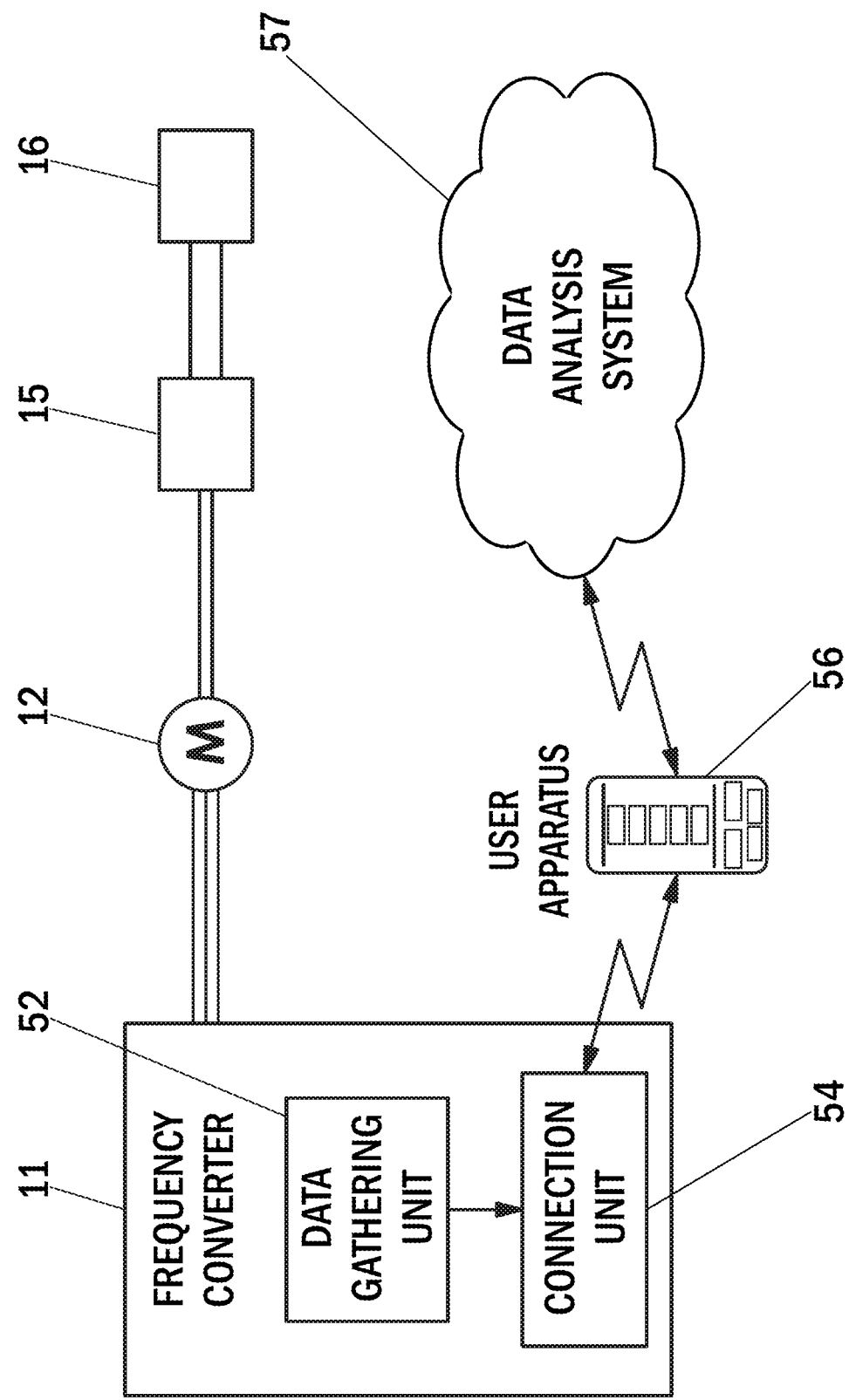
FIG. 6 illustrates a block diagram of a fourth embodiment of an arrangement for identification of torsional natural frequencies of a drivetrain system according to the present invention.

FIG. 6 illustrates a block diagram of a fourth embodiment of an arrangement for identification of torsional natural frequencies of a drivetrain system according to the present invention. In the presented fourth embodiment of an arrangement for identification of torsional natural frequencies of a drivetrain system, said drivetrain system comprises a frequency converter 11, an electric machine 12 controlled by said frequency converter 11, a driven/driving machine system 16 connected to said electric machine 12 via a coupling arrangement 15, a user apparatus 56 and an external data analysis system 57. In the presented fourth embodiment said external data analysis system 57 is implemented as an external cloud computing service. Whereas in the presented embodiment a motor is shown as an electric machine, in another embodiment of the present invention the motor could be replaced by a generator as an electric machine. Whereas in the presented embodiment a driven machine system is shown as a driven/driving machine system, in another embodiment of the present invention the driven machine system could be replaced by a driving machine system as driven/driving machine system.

In the presented fourth embodiment of an arrangement for identification of torsional natural frequencies of a drivetrain system, the frequency converter 11 is arranged to control said motor 12 for producing mechanical excitation by said motor 12 in said drivetrain system. Said the frequency converter 11 is also arranged to measure the current flowing between said frequency converter 11 and said motor 12 as measured current data and arranged to detect an excitation response from said measured current data.

In presented fourth embodiment of an arrangement for identification of torsional natural frequencies of a drivetrain system, the data analysis is implemented on an external data analysis system 57. Said external data analysis system 57 may be realized as a partially external data analysis system or as an entirely external data analysis system. In the presented fourth embodiment, the frequency converter 11 comprises a data gathering unit 52 and a connection unit 54.

Said data gathering unit 52 gathers data related to the identifying torsional natural frequencies of a drivetrain system, said gathered data comprising at least control data for motor 12. Said control data for motor 12 comprises excitation control data for producing excitation, i.e. excitation torque. Said gathered data comprises measured current data as excitation response data.

The data gathering unit 52 then forwards said gathered data to the connection unit 54. The connection unit 54 is arranged to receive said gathered data from the data gathering unit 52 and to transmit said gathered data to said data analysis system 57 via said user apparatus 56. So first, the connection unit 54 receives said gathered data from the data gathering unit 52 and transmits said gathered data to said user apparatus 56.

The connection unit 54 is configured to establish a connection with said user apparatus 56. The connection unit 54 may communicate with said user apparatus 56 via standard wireless communication protocols, for example. The connection unit 54 may establish the communication link via Bluetooth, ZigBee, near field communication (NFC), or infrared protocols, for example.

The user apparatus 56 may be a handheld communication device, such as a smart phone or a tablet computer. The user apparatus 56 may be arranged to receive said gathered data from the connection unit 54 of the frequency converter 11 and to forward said gathered data to said external data analysis system 57. Said external data analysis system 57 may be implemented as an external cloud computing service. The user apparatus 56 may be arranged to communicate with said external data analysis system 57 through wireless networks, such as cell phone networks or WLAN.

The data analysis system 57 is arranged to receive said gathered data from the user apparatus 56. The data analysis system 57 may also be arranged to receive user input from the user apparatus 56. The data analysis system 57 then analyses said gathered data and identifies, according to the present disclosure, the torsional natural frequencies of the electric machine and/or the condition of the electric machine.

The identified torsional natural frequencies of the electric machine may comprise the resonance frequencies of the electric machine. Furthermore, the identified torsional natural frequencies of the electric machine may comprise the modal behavioural parameters of the electric machine, i.e. the natural mode shapes, natural frequencies and damping of each mode.

A digital twin application may be utilized in the process of identification of the modal behavioural parameters of the electric machine. A digital twin application is a complete and operational virtual representation of an asset, subsystem, or system, combining digital aspects of how the equipment is built, i.e. product lifecycle management data, design models, manufacturing data, with real-time aspects of how it is operated and maintained. The capability to refer to data stored in different places from one common digital twin directory enables simulation, diagnostics, prediction, and other advanced use cases. Furthermore, said identified torsional natural frequencies may be utilized for improving the digital twin application.

With the help of the method and an arrangement for identification of torsional natural frequencies of a drivetrain system according to the present invention the identification of the torsional natural frequencies of a drivetrain system is easier and more efficient, especially in operational condition.

With the help of the solution according to the present invention, a frequency converter can identify the torsional natural frequencies of drivetrain system driven by the same frequency converter. With the help of the solution according to the present invention, this identification can be done with the same frequency converter that is used to produce the supply voltage to electrical machine winding terminals.

Furthermore, the method and an arrangement for identification of torsional natural frequencies of a drivetrain system according to the present invention provides easy and efficient identification of the torsional natural frequencies of a drivetrain system which is also useful in determining the condition of said drivetrain system. Furthermore, the identified torsional natural frequencies can be used for validation of the design and condition monitoring of the torsional system.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims and their equivalents.

The invention claimed is:

1. A method for identification of torsional natural frequencies of a drivetrain system, said drivetrain system comprising a frequency converter, an electric machine controlled by said frequency converter, and a driven/driving machine system connected to said electric machine, in which method:
   mechanical excitation is produced in said drivetrain system by said frequency converter controlled electric machine, said excitation comprising torsional excitation as an impulse, random noise, pseudo random noise, or a harmonic excitation sweep, and said excitation effecting an excitation response in said drivetrain system;
   said excitation response is measured by said frequency converter from the current flowing between said frequency converter and said electric machine as measured current data; and
   torsional natural frequencies of said drivetrain system are identified utilizing said excitation response.

2. The method according to claim 1, wherein the condition of the drivetrain system is analysed and determined utilizing said identified torsional natural frequencies of said drivetrain system.

3. An arrangement for identification of torsional natural frequencies of a drivetrain system, said drivetrain system comprising a frequency converter, an electric machine controlled by said frequency converter, and a driven/driving machine system connected to said electric machine,
   wherein said frequency converter is arranged for controlling said electric machine for producing mechanical excitation by said electric machine in said drivetrain system, said excitation comprising torsional excitation as an impulse, random noise, pseudo random noise, or a harmonic excitation sweep, and said excitation effecting an excitation response in said drivetrain system;
   wherein said frequency converter or a data analysis system of said arrangement is arranged for identifying torsional natural frequencies of said drivetrain system utilizing said excitation response; and
   wherein said frequency converter is arranged for measuring said excitation response from the current flowing between said frequency converter and said electric machine as measured current data.

4. The arrangement according to claim 3, wherein said frequency converter of said arrangement is arranged for analysing and determining the condition of the drivetrain system utilizing said identified torsional natural frequencies of said drivetrain system.

5. The arrangement according to claim 4, wherein said frequency converter comprises:
   a data gathering unit arranged for gathering data, said gathered data including control data for said electric machine and said measured current data; and
   a data analysis unit arranged for analysing said gathered data and for identifying torsional natural frequencies of said drivetrain system and/or for determining the condition of said drivetrain system.

6. The arrangement according to claim 3, wherein said frequency converter comprises:
   a data gathering unit arranged for gathering data, said gathered data including control data for said electric machine and said measured current data; and
   a data analysis unit arranged for analysing said gathered data and for identifying torsional natural frequencies of said drivetrain system and/or for determining the condition of said drivetrain system.

7. The arrangement according to claim 3, wherein said arrangement comprises a data analysis system, and wherein said frequency converter comprises:
- a data gathering unit arranged for gathering data, said gathered data including control data for said electric machine and said measured current data; and
- a connection unit arranged for transmitting said gathered data to said data analysis system,
- wherein said data analysis system is arranged for analysing said gathered data and for identifying torsional natural frequencies of said drivetrain system and/or for determining the condition of said drivetrain system.

8. The arrangement according to claim 7, wherein said arrangement comprises a user apparatus, and
- wherein said connection unit arranged for transmitting said gathered data to said data analysis system via said user apparatus, and
- wherein said user apparatus is arranged for receiving said gathered data from said connection unit and for forwarding said gathered data to said data analysis system.

9. A frequency converter for a drivetrain system, said drivetrain system comprising said frequency converter, an electric machine controlled by said frequency converter, and a driven/driving machine system connected to said electric machine, wherein said frequency converter is arranged:
- for controlling said electric machine for producing mechanical excitation by said electric machine in said drivetrain system, said excitation comprising torsional excitation as an impulse, random noise, pseudo random noise, or a harmonic excitation sweep, and said excitation effecting an excitation response in said drivetrain system;
- for identifying torsional natural frequencies of said drivetrain system utilizing said excitation response; and
- for measuring said excitation response from the current flowing between said frequency converter and said electric machine as measured current data.

10. The frequency converter according to claim 9, wherein said frequency converter is arranged for analysing and determining the condition of the drivetrain system utilizing said identified torsional natural frequencies of said drivetrain system.

* * * * *